United States Patent [19]

Kolb

[11] Patent Number: 4,838,601
[45] Date of Patent: Jun. 13, 1989

[54] FOLDING TOP FOR PASSENGER CARS

[75] Inventor: Eugen Kolb, Stuttgart, Fed. Rep. of Germany

[73] Assignee: Dr. Ing. h.c.F. Porsche Aktiengesellschaft, Stuttgart, Fed. Rep. of Germany

[21] Appl. No.: 174,222

[22] Filed: Mar. 28, 1988

[30] Foreign Application Priority Data

Mar. 26, 1987 [DE] Fed. Rep. of Germany ....... 3709927

[51] Int. Cl.⁴ ............................ B60J 7/12; B60J 7/185
[52] U.S. Cl. ..................................... 296/128; 296/131; 24/462
[58] Field of Search .............. 296/107, 120 A, 120 R, 296/124, 128, 131; 292/DIG. 5, DIG. 73, 271, 275, 277, 341.12; 24/682, 459, 462

[56] References Cited

U.S. PATENT DOCUMENTS

| 133,619 | 12/1872 | Bauer | 296/124 |
| 502,606 | 8/1893 | Bougie | 296/128 |
| 1,223,275 | 4/1917 | Hancock | 296/128 |
| 4,165,112 | 8/1979 | Kleefeldt | 292/341.12 X |
| 4,466,644 | 8/1984 | Wooten et al. | 296/224 X |
| 4,662,672 | 5/1987 | Yamamoto et al. | 296/224 |

FOREIGN PATENT DOCUMENTS 3127524 1/1983 Fed. Rep. of Germany .

Primary Examiner—Dennis H. Pedder
Attorney, Agent, or Firm—Barnes & Thornburg

[57] ABSTRACT

A folding top for a passenger car comprises a folding top linkage having a main bow disposed at the body, lateral side members and a toggle joint system. Each side member is pivoted at the main bow via a roof frame control arm and an angle lever. So that the folding top, in the driving operation, in its folded-back open position, is securely held open, a releasable arresting device is provided for fixing the folding top.

14 Claims, 2 Drawing Sheets

FOLDING TOP FOR PASSENGER CARS

BACKGROUND AND SUMMARY OF THE INVENTION

The invention relates to a folding top for passenger cars that comprises a folding top linkage having a main bow disposed at the body, lateral side members and a toggle joint system, each side member, via a roof frame control arm and an angle lever, being pivoted at the main bow, and the folding top being movable from a closed position into a folded-back open position and vice versa.

A known folding top of the initially mentioned type (DE-PS No. 31 27 524) functions well and distinguishes itself by a simple construction. However, no measures are taken at this folding top for fixing the folding top in its folded-back open position — particularly in vertical direction. For this reason, the folding top, during the driving operation, as a result of uneven road conditions or the like, may automatically be swivelled upward, which is annoying and impairs the view toward the rear.

It is an object of the invention to take such measures at a folding top that a swivelling-upward of the folding top in its folded-back open position is avoided.

According to the invention, this objective is achieved by providing a releasable arresting device for fixing the folding top in its folded back open position.

The main advantages achieved by the invention are that the folding top, by means of a releasable arresting device, is fixed in its folded-back open position so that an unwanted swivelling-upward of the folding top is reliably avoided. The arresting device has a simple construction and can be mounted easily.

Other objects, advantages and novel features of the present invention will become apparent from the following detailed description of the invention when considered in conjunction with the accompanying drawings.

BRIEF DESCRIPTION OF THE DRAWINGS

FIG. 4 is a sectional view corresponding to FIG. 3, showing another embodiment of the arresting device.

DETAILED DESCRIPTION OF THE DRAWINGS

Figure 1:
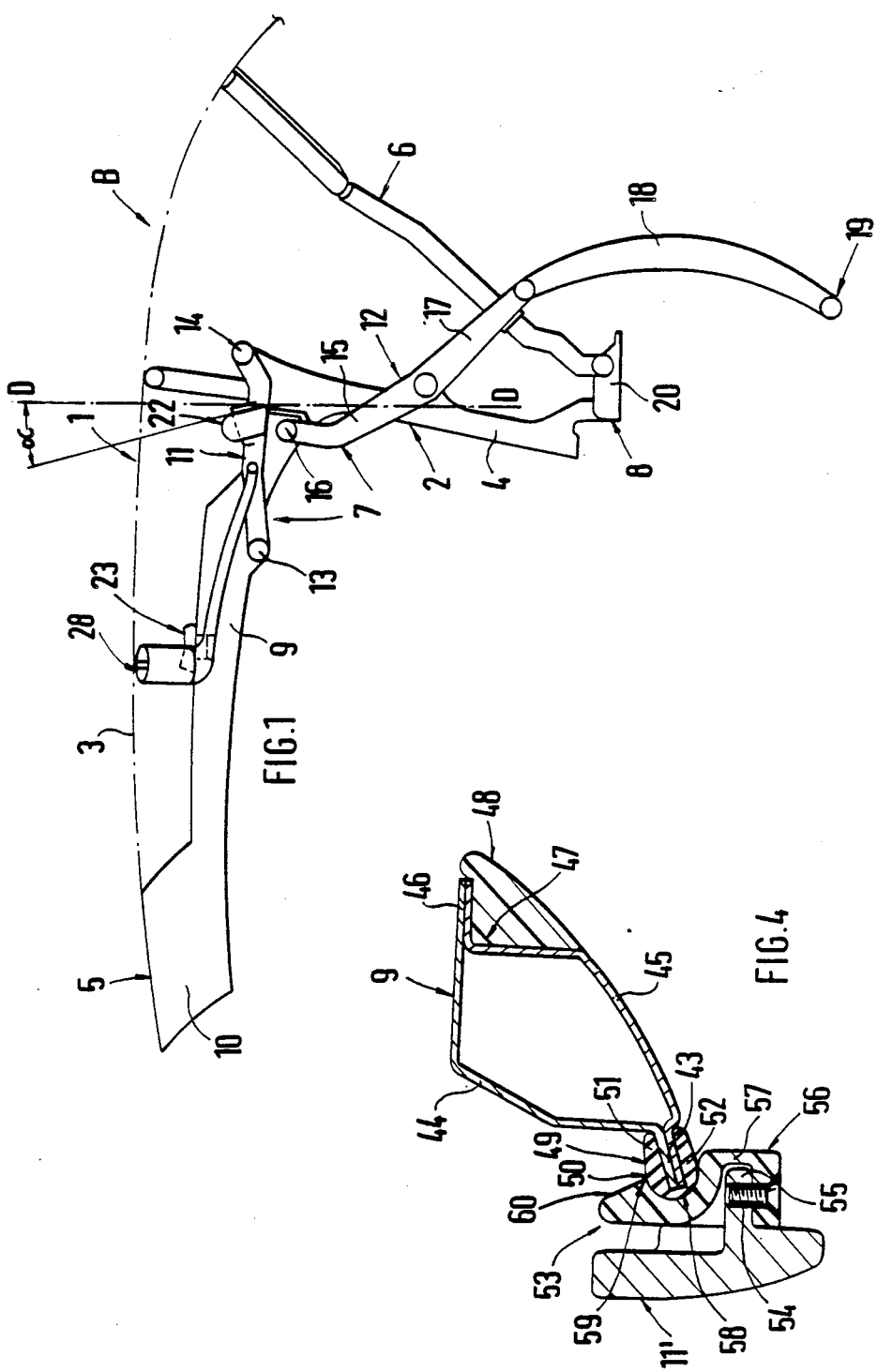
FIG. 1 is a partial lateral schematic view of a folding top in its closed position constructed in accordance with a preferred embodiment of the present invention.
Figure 2:
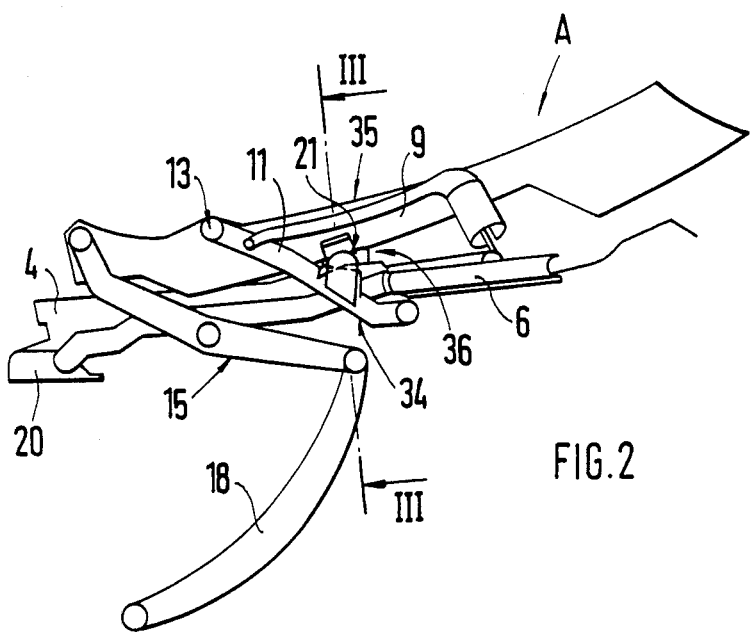
FIG. 2 is a partial lateral view of the folding top of FIG. 1 in the folded-back open position.

FIG. 1 shows a folding top 1 for a passenger car that extends from a partition arranged behind a back seat system to a windshield frame and is releasably fixed there by means of holding members that are not shown in detail. The folding top 1 comprises a folding top linkage 2 and a folding top covering 3. The folding top linkage 2 is composed of a main bow 4 disposed at the body, a roof frame 5, a supporting bow 6 and a toggle joint system 7.

The main bow 4 that spans the passenger compartment in a curved way is conventionally coupled to a lower part of the body by means of hinges 8. The roof frame 5 is formed by lateral side members 9 and a cross member 10 extending adjacent to the windshield, and, on the one hand, is pivoted at the main bow 4 via a roof frame control arm 11 and, on the other hand, via an angle lever 12.

The roof frame control arm 11, in the closed position B of the folding top 1, is aligned approximately horizontally and, via a pivotal point 13, interacts with the side member 9 and via anotehr pivotal point 14, with the main bow 4. The angle lever 12, in a central area of its longitudinal course, is pivoted at the main bow 4. An upper lever arm 15 of the angle lever 12 is connected with the free, rear-located end 16 of the side member 9, whereas the lower lever arm 17 is in operative connection with a guiding control arm 18, the other end 19 of which is pivoted at the lower part of the body.

The supporting bow 6—viewed in driving direction—extends behind the main bow 4 and separately from it, is pivoted at a joint hinge block 20.

In order to avoid a swivelling-upward of the folding top 1 in its folded-back open position A, a releasable arresting device 21 is provided at the folding top 1. The arresting device 21 that is arranged only at parts of the folding top linkage 2 is formed by a receiving part 22 and by a locking element 23 that interacts with the receiving part 22 in a form-fitting way at least one of the receiving part 22 and locking element 23 being elastic. The receiving part 22 is arranged at the roof frame control arm 11, and the locking element 23 is arranged at the lateral side member 9. According to a first embodiment (FIG. 3), the receiving part 22 is profiled approxiamately U-shaped and is placed onto the roof frame control arm 11 from the direction of the upper side. A leg 24 of the receiving member 22 that projects downward has an opening 25 for the leading-through of a fastening screw 26, the fastening screw 26 being screwed into a threaded bore 27 of the roof frame control arm 11.

On the side that faces the side member 9, the receiving part 22 has a trough-shaped recess 29 into which an end section 30 of the locking element 23 engages that is laterally set-out and is profiled approximately in the shape of a half-circle. Above the recess 29, a stopping slope 31 for the locking element 23 is provided at the receiving part 22. Between the stopping slope 31 and the recess 29, a cam 32 is developed over which the locking element 23 exercises pressure when the folding top 1 is opened and closed. The cam 32 extends at a distance C from the bottom of the recess 29 so that in the open position A of the folding top 1, the locking element 23 reaches behind the cam 32 and is held in position in the recess 29 in a self-locking way.

At least the stopping slope 31 and the cam 32 are arranged at an elastic tongue 33 of the receiving element 22, the tongue 33 being aligned approximately upright and, —in verticle view —in sections, reaching over the stopping element 23.

When the folding top 1 is closed, the elastic tongue 33 is pressed to the side by means of the locking element 23, namely in the direction of the roof frame control arm 11, so that, after the passing-through of the cam 32, the locking element 23 disengages from the recess 29.

The receiving part 22—viewed in the closed position B of the folding top 1—is arranged directly in front of the main bow 4 of the folding top linkage 2 and extends at an acute angle α with respect to a vertical auxiliary plane D—D. When the folding top is closed, the locking element 23 extends approximately below an auxiliary bow 28 that spans the passenger compartment in a curved shape. In the open position A of the folding top 1, the side member 9 and the roof frame control arm 11, form the handles 34, 35 of a pair of scissors 36, the coupling point 13 forming the pivot of the effective "scissors" 36. By means of the arresting device 21, the two handles 34, 35 of the scissors 36 are fixed with respect to one another so that an automatic swivelling-upward of the folding top 1 is avoided.

Figure 3:
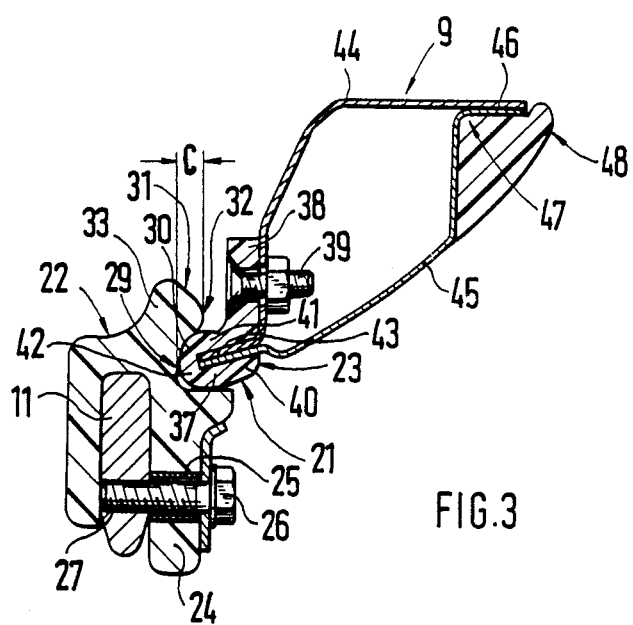
FIG. 3 is a sectional view taken along the Line III—III of FIG. 2 showing the arresting device according to the invention.

According to FIG. 3, the locking element 23 comprises a clamping profile section 37 that is profiled approximately U-shaped and a holding web 38 that is connected with the side member 9 by means of a fastening screw 39. The clamping profile section 37 consists of two legs 40, 41 that extend in parallel to one another and, via a rounded transition area 42, are connected with one another. The two legs 40, 41 rest against opposite sides of an end-face flange 43 of the side member 9 and cover it. The rounded transition area 42, in sections, engages in the recess 29 of the receiving element 22. The side member 9 consists of two sheet steel stampings 44, 45 that are fitted together in the manner of a hollow frame and are connected with one another at end-face flanges 43, 46 extending in the same direction, by means of spot-welding. Viewed in the closed position B of the folding top 1, the locking element 23 is fitted onto the flange 43 of the side member 9 that is located on top and faces the passenger compartment. A step-shaped setting-out 47 of the side member 9 that is located adjacent to the flange 46, is covered by a profile part 48 made of rubber, plastic material, foamed material or the like, the profile part 48 being adapted to the shape of the side member 9.

FIG. 4 shows another embodiment of an arresting device 21 that comprises a locking element 49 and a receiving part 53. The locking element 49 is formed by a clamping profile section 50 that is profiled in a U-shape, the legs 51, 52 surrounding the flange 43 of the side member 9 resting against the flange 43 while being prestressed, so that the locking element 49 is held in position in a self-acting way.

The receiving part 53 is laterally fitted onto the roof frame control arm 11′ and, via an upright-extending fastening screw 54, is connected with a web-shaped molded-on part 55 of the roof frame control arm 11. The receiving part 53 rests against the underside of the molded-on part 55 and surrounds it with an approximately U-shaped profiled section 56. An upright-extending wall section 57 of the receiving part 53, in the area of the molded-on part 55, has a relatively small wall thickness (hinge effect), whereby the area of the receiving part 53 that is located above the molded-on part 55 and comprises a recess 58, a cam 59 and a stopping slope 60, can be moved in transverse direction E—E.

The receiving part 22; 53 is made of a suitable plastic material, such as polyamide, whereas the locking element 23; 49 consists of rubber or a plastic material and, if necessary, may be provided with a reinforcing insert.

Although the present invention has been described and illustrated in detail, it is to be clearly understood that the same is by way of illustration and example only, and is not to be taken by way of limitation. The spirit and scope of the present invention are to be limited only by the terms of the appended claims.

I claim:

1. A folding top for passenger vehicles comprising:
    (a) a main bow pivotally attachable to a vehicle;
    (b) a roof frame formed by lateral side members and a cross member;
    (c) a toggle joint system for pivotally connecting the roof frame and the main bow, the toggle joint system including a roof frame control arm;
    (d) a locking element positioned on a lateral side member of the roof frame having a semi-circular end section, the locking element having a substantially U-shape in cross-section to form a channel for receiving an end face flange of the lateral side member of the roof frame; and
    (e) a complementary receiving element having, on a side facing the lateral side member, a locking element receiving recess for receiving and releasably retaining in a a form-fitting manner the semi-circular end section of the locking element, the receiving element being positioned on the roof frame control arm of the toggle joint system so that when the folding top is moved from a closed position to a folded-back open position, the semi-circular end section of the locking element is received and retained by the receiving recess of the receiving element to maintain the folded top in the folded-back position.

2. A folding top according to claim 1, wherein one of the locking element and complementary receiving element is elastic.

3. A folding top according to claim 2, wherein the receiving element has a control arm receiving channel formed by downwardly projecting legs for receiving and surrounding a portion of the roof frame control arm, one of the legs of the channel being fastened to the roof frame control arm by a fastening screw.

4. A folding top according to claim 3, wherein the receiving element has a stopping slope positioned above the locking element receiving recess which the locking element abuts when first contacting the receiving element and a cam surface arranged between the stopping slope and receiving recess whereby the locking element is forced past the stopping slope due to elastic deformation of one of the locking and retaining elements and guided to the receiving recess by the cam surface.

5. A folding top according to claim 1, wherein the receiving element includes means to detachably affix the receiving element to the roof frame control arm.

6. A folding top for passenger vehicles comprising:
    (a) a main bow pivotally attachable to a vehicle;
    (b) a roof frame formed by lateral side members and a cross member;
    (c) a toggle joint system for pivotally connecting the roof frame and the main bow, the toggle joint system including a roof frame control arm having a substantially horizontal web-type, molded-on section;
    (d) a locking element positioned on a lateral side member of the roof frame and having a semi-circular end section; and
    (e) a complementary receiving element having a substantially U-shaped cross-section which forms a channel for receiving the horizontal section of the control arm, a fastening screw connecting the receiving element to the control arm, and on a side facing the lateral side member, the receiving element further having a locking element receiving recess for receiving and releasably retaining in a form-fitting manner the semi-circular end section of the locking element, the receiving element being positioned on the roof frame control arm of the toggle joint system so that when the folding top is moved from a closed position to a folded-back open position, the semi-circular end section of the locking element is received and retained by the receiving recess of the receiving element to maintain the folded top in the folded-back position.

7. A folding top according to claim 6, wherein the receiving element has a stopping slope positioned above the locking element receiving recess which the locking element abuts when first contacting the receiving element and a cam surface arranged between the stopping slope and receiving recess whereby the locking element is forced past the stopping slope and guided to the receiving recess by the cam surface.

8. A folding top for passenger vehicles comprising:
(a) a main bow pivotally attachable to the vehicle;
(b) a roof frame formed by lateral side members and a cross member;
(c) a toggle joint system for pivotally connecting the roof frame and the main bow, the toggle joint system including a roof frame control arm;
(d) a locking element positioned on a lateral side member of the roof frame; and
(e) a complementary receiving element for receiving and releasably retaining the locking element, one of the locking element and complementary receiving element being elastic, the receiving element having means to releasably affix the receiving element to the roof frame control arm of the toggle joint system, and the locking element having a semi-circular end section which is received and retained by the complementary receiving element, and the locking element further being substantially U-shaped in cross-section to form a channel for receiving an end face flange of the lateral side member of the roof frame so that when the folding top is moved from a closed position to a folded-back open position, the receiving element receives and retains the locking element and maintains the folded top in the folded-back position.

9. A folding top according to claim 8, wherein the means to releasably affix the receiving element comprises a control arm receiving channel formed by downwardly projecting legs for receiving and surrounding a portion of the roof frame control arm, one of the legs of the channel being fastened to the roof frame control arm by a fastening screw.

10. A folding top according to claim 8, wherein the receiving element, on a side facing the lateral side member of the roof frame, has a locking element receiving recess into which the semi-circular end section of the locking element is received and retained in a form-fitting manner.

11. A folding top according to claim 10, wherein the receiving element has a stopping slope positioned above the locking element receiving recess which the locking element abuts when first contacting the receiving element and a cam surface arranged between the stopping slope and receiving recess whereby the locking element is forced past the stopping slope due to elastic deformation of one of the locking and retaining elements and guided to the receiving recess by the cam surface.

12. A folding top for passenger vehicles comprising:
(a) a main bow pivotally attachable to the vehicle;
(b) a roof frame formed by lateral side members and a cross member;
(c) a toggle joint system for pivotally connecting the roof frame and the main bow, the toggle joint system including a roof frame control arm having a substantially horizontal web-type, molded-on section;
(d) a locking element positioned on a lateral side member of the roof frame; and
(e) a complementary receiving element for receiving and releasably retaining the locking element, one of the locking element and complementary receiving element begin elastic, the receiving element having a means to releasably affix the receiving element to the roof frame control arm of the toggle joint system, including a substantially U-shaped cross-section which forms a channel for receiving the horizontal section of the control arm, a fastening screw connecting the receiving element to the control arm, so that when the folding top is moved from a closed position to a folded-back open position, the receiving element receives and retains the locking element and maintains the folded top in the folded-back position.

13. A folding top according to claim 12, wherein the receiving element, on a side facing the lateral side member of the roof frame, has a locking element receiving recess into which a semi-circular end section of the locking element is received and retained in a form-fitting manner.

14. A folding top according to claim 13, wherein the receiving element has a stopping slope positioned above the locking element receiving recess which the locking element abuts when first contacting the receiving element and a cam surface arranged between the stopping slope and receiving recess whereby the locking element is forced past the stopping slope due to elastic deformation of one of the locking and retaining elements and guided to the receiving recess by the cam surface.

* * * * *